United States Patent [19]

Nagasaki et al.

[11] Patent Number: 5,354,810
[45] Date of Patent: Oct. 11, 1994

[54] ACETAL RESIN COMPOSITION

[75] Inventors: Kosuke Nagasaki, Kurashiki; Ryoichi Nakai, Yokohama, both of Japan

[73] Assignee: Asahi Kasei Kogyo Kabushiki Kaisha, Osaka, Japan

[21] Appl. No.: 21,361

[22] Filed: Feb. 23, 1993

[30] Foreign Application Priority Data

Feb. 26, 1992 [JP] Japan .................... 4-039650

[51] Int. Cl.$^5$ ............... C08L 59/02; C08L 59/04; C08L 33/08; C08L 33/10
[52] U.S. Cl. ..................... 525/64; 525/69; 525/154; 525/902; 524/86; 524/91
[58] Field of Search ............... 525/154, 64, 902, 69; 524/91, 86

[56] References Cited

U.S. PATENT DOCUMENTS

| | | | |
|---|---|---|---|
| 3,749,755 | 7/1973 | Bronsterk et al. | 260/876 |
| 4,639,488 | 1/1987 | Schuette et al. | 524/504 |
| 5,183,858 | 2/1993 | Sasaki et al. | 525/154 |

FOREIGN PATENT DOCUMENTS

| | | | |
|---|---|---|---|
| 0115373 | 1/1983 | European Pat. Off. | |
| 0192356 | 8/1986 | European Pat. Off. | 525/154 |
| 0342000 | 11/1989 | European Pat. Off. | |
| 0482352 | 4/1992 | European Pat. Off. | 525/902 |
| 0494534 | 7/1992 | European Pat. Off. | 525/902 |
| 64-54053 | 3/1989 | Japan . | |
| 1-170641 | 7/1989 | Japan . | |
| 2-294352 | 12/1990 | Japan . | |
| 3052910 | 3/1991 | Japan | 525/902 |

*Primary Examiner*—James J. Seidleck
*Assistant Examiner*—W. Robinson H. Clark
*Attorney, Agent, or Firm*—Pennie & Edmonds

[57] ABSTRACT

The present invention provides an acetal resin composition comprising:

(1) 100 parts by weight of an acetal resin; and
(2) from 1 to 100 parts by weight of a multiphase interpolymer particle comprising at least an elastomeric phase and a rigid phase, the elastomeric phase obtained by copolymerizing:

(A) from 5 to 60% by weight, based on the total weight of monomers for the elastomeric phase, of at least one compound selected from the group consisting of $C_1$ to $C_6$-alkyl monoacrylate, $C_1$ to $C_6$-alkyl monomethacrylate, $C_1$ to $C_6$-hydroxyalkyl monoacrylate and $C_1$ to $C_6$-hydroxyalkyl monomethacrylate; and (B) from 40 to 95% by weight, based on the total weight of monomers for the elastomeric phase, of at least one compound selected from the group consisting of $C_7$ to $C_{12}$-alkyl monoacrylate and $C_7$ to $C_{12}$-alkyl monomethacrylate.

The acetal resin composition is excellent in both matte property and flexural modulus, and inhibits mold deposit in mold processing.

11 Claims, No Drawings

ACETAL RESIN COMPOSITION

BACKGROUND OF THE INVENTION

1. Field of the Invention

The present invention relates to acetal resin compositions containing a specific component of a multiphase interpolymer. More particularly, it relates to acetal resin compositions exhibiting excellent matte property and flexural modulus, and capable of inhibiting mold deposit in the mold processing.

2. Description of Related Art

An acetal resin has been widely used as an engineering resin in various fields, especially automobile and home electric appliance fields, for its excellent mechanical and molding properties. However, molded products of an acetal resin have a high surface gloss so that sometimes a feeling of quality is harmed when they are used for interior automotive trim. Thus, there is a great need for matte molded products.

To obtain matte molded products, there have been known several methods such as a matte process for molding resins with an embossing mold and a painting process for making matte coatings. The former process cannot provide desirable matte molded procuts, and the latter process unfavorably has environmental problems due to organic solvents contained in the coatings.

Various types of low gloss acetal resin compositions have been developed. Japanese Patent Application Laid-Open Nos. 54053/1989 and 170641/1989 and European Patent Unexamined Publication No. 342,000 disclose compositions incorporating elastomeric polymers or inorganic fillers in a resin matrix. However, the incorporation of the elastomeric polymers for maintaining or improving the impact resistance may have degraded heat resistance. In the latter composition, a sufficient matte effect is not attained though irregular reflection results from a rough surface of the molded product. The additives lower the mechanical properties, especially extensibility and toughness, of the compositions. Moreover, the products molded with such acetal resin compositions have extremely degraded weathering resistance (light stability) so that they are not suitable for use in interior automotive trim.

Acetal resin compositions incorporating a multiphase interpolymer are also known. European Patent Unexamined Publication No. 115,373 discloses high impact resistant thermoplastic acetal molding compositions which are modified with a multiphase interpolymer comprising a cross-linked acrylic central phase and a rigid thermoplastic outermost phase grafted thereon.

U.S. Pat. Nos. 3,749,755 and 4,639,488 disclose molding compositions based on a mixture of an oxymethylene polymer and an elastomeric graft copolymer which exhibit high impact resistance. However, these compositions have considerably degraded mechanical properties, especially, strength and elasticity, which an acetal resin inherently possesses, and their thermal stability during processing are not sufficient. Such compositions are not intended to improve their matte property, therefore, the matte effect is not satisfactory and neither is the weathering resistance.

Japanese Patent Application Laid-Open No. 294352/1990 discloses acetal resin compositions including a multiphase interpolymer and a methacrylate polymer. The compositions are produced only to improve weathering resistance so that their matte property is not improved.

Further, for the purpose of improving weathering resistance (light stability), it is well known that stabilizers such as ultraviolet (referred to hereinafter as UV) absorbers and light stabilizers can be added to acetal resins. However, they do Rot exhibit excellent mold deposit in spite of their good weathering resistance.

As described above, conventional acetal resin compositions do not possess an excellent matte property while retaining good flexural modulus and preventing undesirable mold deposit.

SUMMARY OF THE INVENTION

The present invention provides a novel acetal resin composition containing a specific component of a multiphase interpolymer. The acetal resin composition exhibits excellent matte property while retaining the inherent mechanical properties of an acetal resin and reducing mold deposit remarkably.

DETAILED DESCRIPTION OF THE INVENTION

An aspect of the present invention is to provide an acetal resin composition comprising:

(1) 100 parts by weight of an acetal resin; and
(2) from 1 to 100 parts by weight of a multiphase interpolymer particle comprising at least an elastomeric phase and a rigid phase, the elastomeric phase obtained by copolymerizing:
- (A) from 5 to 60 % by weight, based on the total weight of monomers for the elastomeric phase, of at least one compound selected from the group consisting of $C_1$ to $C_6$-alkyl monoacrylate, $C_1$ to $C_6$-alkyl monomethacrylate, $C_1$ to $C_6$-hydroxyalkyl monoacrylate and $C_1$ to $C_6$-hydroxyalkyl monomethacrylate; and
- (B) from 40 to 95 % by weight, based on the total weight of monomers for the elastomeric phase, of at least one compound selected from the group consisting of $C_7$ to $C_{12}$-alkyl monoacrylate and $C_7$ to $C_{12}$-alkyl monomethacrylate.

Acetal resins to be used in the present invention include oxymethylene homopolymers consisting essentially of oxymethylene units and produced by polymerizing a formaldehyde monomer, cyclic oligomers such as trioxan, tetraoxan and the like; oxymethylene copolymers containing from 0.1 to 20 % by weight of a $C_2$ to $C_8$-oxyalkylene group and produced by polymerizing the above-mentioned formaldehyde monomer or cyclic oligomers with cyclic ethers such as ethylene oxide, propylene oxide, epichlorohydrin, 1,3-dioxolane, glycol formal, diglycol formal and the like; branched oxymethylene copolymers; and oxymethylene block copolymers containing 50% by weight or more of repeating units of oxymethylene and 50% by weight or less of other polymer units.

A multiphase interpolymer particle to be used in the present invention comprises at least an elastomeric phase and a rigid phase. A number and an arrangement of the elastomeric phase and the rigid phase are not particularly restricted. The elastomeric phase (the rigid phase) may be adjacent to other elastomeric phase (other rigid phase) or may be alternated with the rigid phase (the elastomeric phase).

Representative examples of the multiphase interpolymer include a two-phase structure comprising an elastomeric phase as a central core phase and a rigid phase as an outermost phase, and a three-phase structure comprising rigid phases as central core and outermost phases and an elastomeric phase as an intermediate phase.

Polymers for the elastomeric phase have a glass transition temperature of less than 25° C., preferably less than 0° C. Polymers for the rigid phase have a glass transition temperature of 25° C. or more, preferably 50° C. or more.

The elastomeric phase of the multiphase interpolymer for the present invention are obtained by copolymerizing from 5 to 60% by weight, based on the total weight of monomers for the elastomeric phase, of at least one compound selected from the group consisting of $C_1$ to $C_6$-alkyl monoacrylate, $C_1$ to $C_6$-alkyl monomethacrylate, $C_1$ to $C_6$-hydroxyalkyl monoacrylate and $C_1$ to $C_6$-hydroxyalkyl methacrylate (sometimes referred to hereinafter as Component (A)) and from 40 to 95% by weight, based on the total weight of monomers for the elastomeric phase, of at least one compound selected from the group consisting of $C_7$ to $C_{12}$-alkyl monoacrylate and $C_7$ to $C_{12}$-alkyl monomethacrylate (sometimes referred to hereinafter as Component (B)). When the amount of Component (A) is over 60% by weight or the amount of Component (B) is under 40% by weight, the resultant acetal resin composition does not exhibit excellent matte property. When the amount of Component (A) is under 5% by weight or the amount of Component (B) is over 95% by weight, the resultant acetal resin composition becomes extremely soft. Consequently, the good mechanical properties (especially, strength and elasticity) of the acetal resin are degraded considerably. The amounts of Components (A) and (B) for copolymerization should be preferably from 10 to 30% by weight and 70 to 90% by weight, more preferably about 20% by weight and about 80% by weight, respectively.

Suitable monomers for Component (A) include $C_1$ to $C_6$-alkyl monoacrylate such as methyl acrylate, ethyl acrylate, n-butyl acrylate and the like; $C_1$ to $C_6$-hydroxyalkyl monoacrylate such as hydroxyethyl acrylate and the like; $C_1$ to $C_6$-alkyl monomethacrylate such as methyl methacrylate, ethyl methacrylate, n-butyl methacrylate and the like; and $C_1$ to $C_6$-hydroxyalkyl monomethacrylate such as hydroxyethyl methacrylate and the like. Of these, n-butyl methacrylate and methyl methacrylate are most preferred. These monomers may be used individually or in combination.

Suitable monomers for Component (B) include $C_7$ to $C_{12}$-alkyl monoacrylate such as n-octyl acrylate, 2-ethylhexyl acrylate, n-dodecyl acrylate and the like; and $C_7$ to $C_{12}$-alkyl monomethacrylate such as 2-ethylhexyl.methacrylate and the like. Of these, 2-ethylhexyl acrylate and n-dodecyl acrylate are most preferred. These monomers may be used individually or in combination.

The elastomeric phase of the multiphase interpolymer in the present invention preferably includes polymers obtained by polymerizing monomers with Components (A) and (B). Representative examples of the monomers include aromatic vinyl monomers such as styrene, p-methylstyrene, α-methylstyrene and the like; vinyl halide monomers such as vinyl chloride, vinylidene chloride and the like; nitrile monomers such as acrylonitrile, methacrylonitrile and the like; vinyl ester monomers such as vinyl acetate, vinyl propinate and the like; unsaturated amide monomers such as acrylamide, methacrylamide and the like; vinyl alkyl ether monomers such as vinyl methyl ether, vinyl ethyl ether, vinyl butyl ether and the like; conjugated diene monomers such as butadiene, isoprene and the like; and monomers having two or more of double bonds in one molecule such as ethylene glycol diacrylate, butylene diacrylate, divinylbenzene, allylacrylate, allylmethacrylate and the like. Of these, the conjugated diene is most preferred from the standpoint of matte property. Some of these monomers have a function such as a graft agent and a cross-linker. These monomers may be copolymerized in the amount range which does not harm inherent properties of the multiphase interpolymers in the present invention, preferably in the range of from 0.01 to 5% by weight, more preferably in the range of from 0.1 to by weight, based on the total weight of monomers for the elastomeric phase. When these monomers are employed, it is necessary that the amounts of Components (A) and (B) be in the range of from 5 to 60% by weight and from 40 to 95% by weight, respectively.

The rigid phase of the multiphase interpolymer in the present invention preferably includes a polymer obtained by polymerizing at least one monomer comprising acrylic esters, methacrylic esters, aromatic vinyls or vinyl halides. Of these, at least one monomer selected from methyl acrylate, methyl methacrylate, styrene and vinyl chloride are most preferable.

Preferable combinations of polymers comprising the elastomeric phase and the rigid phase include:

(a) the rigid phase comprising a polymer obtained by polymerizing methyl methacrylate as a main component and the elastomeric phase comprising a polymer obtained by polymerizing about 80% by weight of 2-ethylhexyl acrylate and about 20% by weight of methyl methacrylate;

(b) the rigid phase comprising a polymer obtained by polymerizing methyl acrylate as a main component and the elastomeric phase comprising a polymer obtained by polymerizing 75% by weight or more of 2-ethylhexyl acrylate, 20% by weight of n-butyl acrylate and 5% by weight or less of butadiene; and (c) the rigid phase comprising a polymer obtained by polymerizing styrene as a main component and the elastomeric phase comprising a polymer obtained by polymerizing 60% by weight or more of n-dodecyl acrylate, 20% by weight of methyl methacrylate and 20% by weight or less of other copolymerizable monomers.

The amounts of the elastomeric and rigid phases in the multiphase interpolymer are not particularly restricted. It is preferred that the elastomeric phase be contained in the range of from 40 to 80% by weight and the rigid phase be contained in the range of from 20 to 60% by weight.

In the present invention, for the purpose of improving surface adhesion between acetal resins and the multiphase interpolymers, the outermost phase may have functional groups such as an epoxy group, an hydroxyl group, a carboxyl group and the like. The outermost phases containing such functional groups are obtained by copolymerizing vinyl monomers having epoxy groups, hydroxyl groups, carboxyl groups and the like with monomers composed of the outermost phase.

Representative examples of vinyl monomers having epoxy groups include glycidyl esters of $\alpha,\beta$-unsaturated acids represented by the following general formula:

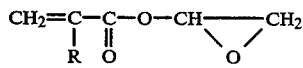

wherein R represents a hydrogen atom and a lower alkyl group.

Representative examples of such glycidyl esters are glycidyl acrylate, glycidyl methacrylate, glycidyl ethacrylate and the like. Of these, glycidyl methacrylate is most preferred.

Representative examples of vinyl monomers having a hydroxyl group include hydroxyethyl acrylate, hydroxyethyl methacrylate, hydroxypropyl acrylate, hydroxypropyl methyacrylate, hydroxyisopropyl acrylate, hydroxyisopropyl methacrylate, hydroxybutyl acrylate, hydroxybutyl methacrylate and the like. Of these, hydroxyethyl acrylate, hydroxyethyl methacrylate, hydroxypropyl acrylate and hydroxypropyl methacrylate are most preferred.

Representative examples of vinyl monomers having carboxyl groups include acrylic acid, methacrylic acid and the like.

The amount of these vinyl monomers to be copolymerized with monomers to obtain the outermost phase is preferably in the range of from 0.5 to 10.0% by weight based on the total monomers to obtain the multiphase interpolymers. More preferable amount is in the range of from 1.0 to 5.0% by weight in view of excellent matte property of the resultant resin composition.

The multiphase interpolymers in the present invention can be obtained by using known emulsion polymerization process described as in U.S Pat. No. 3,793,402 and European Patent Unexamined Publication No. 115,373.

A representative example of the process for obtaining the multiphase interpolymer having a two-phase structure is as follows. The above-mentioned monomers to obtain the elastomeric phase and a polymerization initiator such as diisopropylbenzene hydroperoxide and the like are added to water with an emulsifier such as dioctyl sodium sulfosuccinate, and polymerized at a temperature of from 50° to 90° C. with stirring. During this process, for the purpose of giving appropriate elasticity to the elastomeric phase, a polyfunctional cross-linker such as a divinyl compound is preferably copolymerized. The amount of the polyfunctional cross-linker is preferably in the range of from 0.01 to 5.0% by weight based on the total weight of the polymers composed of the elastomeric phase. Moreover, it is preferred to add a polyfunctional grafting agent such as allyl acrylate and the like in order to achieve a chemical bond between the elastomeric and rigid phases. The amount of the polyfunctional grafting agent is preferably in the range of from 0.01 to 5.0% by weight based on the total weight of the polymers.

When the polymerization reaction of the elastomeric phase is completed, the above-mentioned monomers for the rigid phase and the vinyl monomers having functional groups such as an epoxy group and a hydroxyl group are added. Further, a polymerization initiator may be added, and the reaction is conducted at a temperature of from 50° to 90° C.

The resultant multiphase interpolymer can be separated in the form of particles from water in accordance with known methods such as salting-out, freezing and thawing, spray-dry and the like.

The diameter of the multiphase interpolymer is preferably 1 μm or less, more preferably in the range of from 0.5 to 0.05 μm.

In the case of the multiphase interpolymer having a three-phase structure, monomers for the central phase and additives such as a polyfunctional grafting agent and the like are first polymerized, and then, an intermediate phase of the elastomeric phase and an outermost phase of the rigid phase are polymerized according to the above-mentioned process.

In the present invention, the amount of the multiphase interpolymers is in the range of from 1 to 100 parts by weight per 100 parts by weight of the acetal resins. When it is under 1 part by weight, the matte property is not satisfactory. When it is over 100 parts by weight, the molding characteristic of the acetal resins is degraded. The amount of the multiphase intercopolymers is preferably in the range of from 2 to 20 parts by weight, more preferably in the range of from 4 to 15 parts by weight.

As the multiphase interpolymers to be used in the present invention, it is preferred that impurities such as alkali metal compounds and sulfur compounds are not much present from the viewpoint of thermal stability. The alkali metal compounds in the present invention indicate lithium, potassium and sodium. The alkali metal compound and the sulfur compound are derived from an emulsifier such as a sulfonate (e.g., lithium dodecylbenzenesulfate, sodium dodecylbenzenesulfate, potassium dodecylbenzenesulfate and the like) and a sulfuric ester (e.g., lithium lauryl sulfate, sodium lauryl sulfate, potassium lauryl sulfate and the like), and a salting-out agent such as sodium sulfate, sodium chloride and the like, which are employed in a process for producing a multiphase interpolymer.

In the present invention, the content of the alkali metal compounds is the total amount of lithium, potassium and sodium which is measured by atomic absorption analysis. Particularly, the analysis comprises carbonizing or ashing the multiphase interpolymers and extracting the alkali metal compounds from the resultant with acid aqueous solution. Then, the extracted alkali metal compounds are subjected to an atomic absorption analysis. It is preferred that the content of the alkali metal compounds be 100 ppm or less based on the multiphase interpolymers. More preferably, it is 80 ppm or less, most preferably 60 ppm or less.

In the present invention, the sulfur content is obtained by calculating the total amount of the sulfur compounds measured by ion exchange chromatography as atomic weight of sulfur. Particularly, the multiphase interpolymers are burnt, and the sulfur compounds are extracted from the resultant with alkali aqueous solution, followed by ion exchange chromatography. It is preferred that the content of the sulfur compounds be 200 ppm or less based on the multiphase interpolymers. More particularly, it is 150 ppm or less, most preferably 100 ppm or less.

In the present invention, for the purpose of improving weathering resistance of the acetal resin compounds, specific UV absorbers and light stabilizers can preferably be added to the compounds.

The UV absorbers having a benzotriazole and an oxalic anilide are used in the present invention. The UV absorbers having a benzotriazole include 2-(2'-hydroxy-5'-methylphenyl)benzotriazole, 2-(2'-hydroxy-3',5'-di-t-butylphenyl)benzotriazole, 2-(2'-hydroxy-3',5'-diisoamylphenyl)benzotriazole, 2-[2'-hydroxy-3',5'-bis- α,α-dimethylbenzyl)phenyl]benzotriazole, 2-(2'-hydroxy-4'-octoxyphenyl)benzoltriazole and the like. The UV absorbers having an oxalic anilide include 2-ethoxy-2'-ethyloxalic acid-bisamilide, 2-ethoxy-5-t-butyl-2'-ethyloxalic acid-bisanilide, 2-ethoxy-3'-dodecyloxalic acid-bisanilide and the like. Of these, 2-[2'-hydroxy 3',5'-bis-(α,α-dimethylbenzyl)phenyl]-benzotriazole is most preferable. These UV absorbers may be used individually or in combination.

In the present invention, it is preferred to add the UV absorbers in the range of from 0.01 to 5 parts by weight per 100 parts by weight of acetal resins. More preferably, the content of the UV absorbers is in the range of from 0.05 to 2 parts by weight, most preferably in the range of from 0.1 to 1.5 parts by weight. Though the addition of the UV absorbers can improve weathering resistance, the thermal stability of the obtained compounds is degraded and silver streaks and coloring tend to occur in processing when there is too much of the UV light absorbers.

The hindered amine type light stabilizer to be used in the present invention is preferably selected from the following two light stabilizers.

One of the light stabilizers is represented by the following general formula (I):

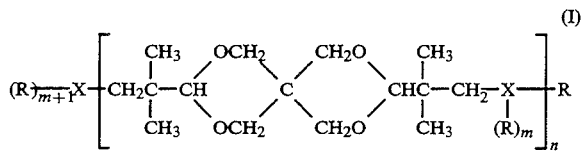

wherein R is a N-substituted 2,2,6,6-tetramethylpiperidine residual group represented by the general formula (II):

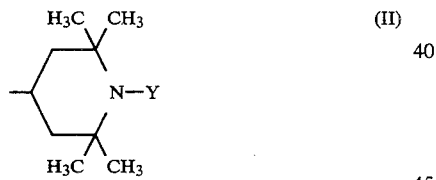

(wherein Y represents a hydrogen atom, a hydroxyl group, an alkyl group, a substituted alkyl group or an acyl group);

X is a polyacyloxy group represented by the general formula (III):

(wherein p represents an intenger of 1 to 4);
m represents a number of 1 to 4; and n represents a number of 1 to 10.

R is introduced into the general formula (I) through an ester bond. The number of R in one molecule is determined by m and n. The minimum number of R is 46 when m and n are 4 and 10, respectively. Because the hindered amine type light stabilizer represented by the general formula (I) has many N-substituted 2,2,6,6-tetramethylpiperidine residual groups, the light stabilizer exhibits excellent effects.

When Y in the general formula (II) is an alkyl group, Y includes a methyl group, an ethyl group, a propyl group, an isopropyl group, a butyl group, an amyl group, a hexyl group, a heptyl group, an octyl group, a 2-ethylhexyl group, a nonyl group, a decyl group, an octadecyl group and the like.

When Y is a substituted alkyl group, Y includes a phenylethyl group, 2-hydroxyethyl group, 2-hydroxypropyl group, 2-hydroxybutyl group, 2,3-epoxypropyl group and the like.

When Y is an acyl group, Y includes an acetyl group, a propionyl group, a butyroyl group, an acryloyl group, a methacryloyl group, an octanoyl group, a benzoyl group and the like.

X in the general formula (I) is derived from the polycarboxylic acid represented by the general formula (IV):

(wherein p is an intenger of 1 to 4.)

The polycarboxylic acid includes propane-1,2,3-tricarboxylic acid, butane-1,2,3,4-tetracarboxylic acid, pentane-1,2,3,4,5-pentacarboxylic acid, hexane-1,2,3,4,5,6-hexacarboxylic acid. Of these, propane-1,2,3-tricarboxylic acid and butane-1,2,3,4-tetracarboxylic acid are preferable.

The other hindered amine type light stabilizer is represented by the following general formula (V):

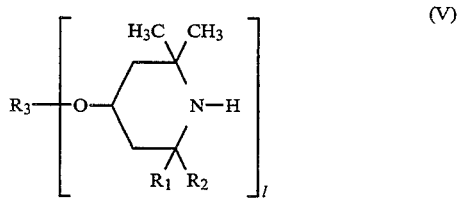

wherein $R_1$ and $R_2$ represent the same or different alkyl groups, l represents 1, 2 or 3; when l is 1, $R_3$ represents a monoacyl group, an alkyl group, a cycloalkyl group, an aryl group, an aralkyl group, a N-substituted carbamoyl group, or a piperidine derivative represented by the general formula (VI):

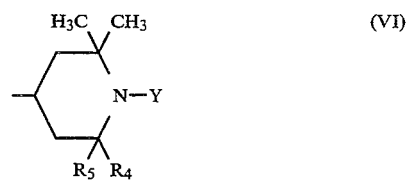

(wherein $R_4$ and $R_5$ represent the same or different alkyl groups);
when l is 2, Rs represents a diacyl group, a dicarbamoyl group, a carbonyl group, an alkylene group, an arylene group and an arylene dialkylene group; and when l is 3, $R_3$ represents a triacyl group and an alkanetoluyl group.

$R_1$ and $R_2$ include a methyl group, an ethyl group, an isopropyl group, a dodecyl group and the like. Further, $R_1$ and $R_2$ may constitute a cyclic structure.

When l is 1, $R_3$ includes an acetyl group, a propionyl group, a butyryl group, a stearoyl group, an acryloyl group, a benzoyl group, a phenoxyacetyl group, a cyclohexanoyl group, an α-naphthoyl group, an ethylcarbamoyl group, a n-butyl carbamoyl group, a methyl group, an ethyl group, a n-butyl group, an octyl group, a styryl group, a cyclopentyl group, a cyclohexyl group, a cycloheptyl group, a benzyl group, a phenethyl group, a phenyl group, a toluyl group, a naphthyl group and the like.

When l is 2, $R_3$ includes a carbonyl group, an oxalyl group, a maloyl group, an adipyl group, a sabacyl group, a fumaryl group, a terephthalyl group, a metylene group, an ethylene group, a propylene group, a hexamethylene group, a p-phenylene group, a p-xylylene group, a tolylene-2,4-dicarbamoyl group, hexamethylene-1,6-dicarbamoyl group and the like.

When l is 3, $R_3$ includes a benzene-1,3,5-tricarbonyl group, a benzene-1,3,4-tricarbonyl group, a cyclohexane-1,3,5-tricarbonyl group, a propane-1,2,3-yl group, a hexane-1,3,6-yl group and the like.

Representative examples of the above hindered amine type light stabilizers include 4-acetoyloxy-2,2,6,6-tetramethylpiperidine, 4-stearoyloxy-2,2,6,6-tetramethylpiperidine, 4-acryloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6tetramethylpiperidin, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)malonate, bis(2,2,6,6-tetramethyl-4-piperidyl)-adipate, bis(2,2,6-tetrametyl-4-piperidyl)-terephtalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)tolylene-2,4-dicarbamate, bis(2,2,6,6-tetramethyl-4-piperidyl)-hexamethylene-1,6-dicarbamate, bis(2,2,6,6-tetramethyl-4-piperidyl)-sebacate, tris(2,2,6,6-tetramethyl-4-piperidyl)-benzene-1,3,5-tricarboxylate, tris(2,2,6,6-tetramethyl-4-piperidyl)benzene-1,3,4-tricarboxylate, and the like. Of these, bis(2,2,6,6-tetramethyl-4-piperidyl)-sebacate, bis(2,2,6,6-tetramethyl-4-piperidyl)-adipate, 4-benzoyloxy-2,2,6,6-tetramethylpiperidine and 4-(phenylcarbamoyloxy)-2,2,6,6-tetramethylpiperidine are preferable. The above light stabilizers may be used individually or in combination.

In the present invention, it is preferred to add the above hindered amine type light stabilizer in the range of from 0.01 to 5 parts by weight based on 100 parts by weight of the acetal resins. More preferably, the content of the light stabilizers is in the range of from 0.05 to 1.5 parts by weight. Though the addition of the light stabilizers can improve weathering resistance, the thermal stability of the obtained compounds is degraded and the appearance of the molded products is remarkably deteriorated because silver streaks and coloring tend to occur in processing when there is too much of the light stabilizers.

Further, the acetal resin compositions of the present invention can employ common additives for acetal resin compositions such as thermal stabilizers including polyamide and melamine; antioxidants including 2,2'-methylene-bis(4-methyl-6-t-butylphenol), triethylene glycolbis[3-(3-t-butyl-5-methyl-4-hydroxyphenyl)propionate] and pentaerythritoltetrakis[3-(3,5-di-t-butyl-4-hydroxyphenyl)propionate]; antistatic agents including polyethylene glycol, polypropylene glycol and polyethylene glycol alkylether; lubricants; reinforcements including glass fiber, carbon fiber, potassium titanate fiber and organic fiber; inorganic fillers including glass bead, talc and calcium carbonate; nucleators; parting agents; plasticizers; carbon blacks and pigment. They can be added in the range which does not degrade the inherent characteristics of the acetal resin.

The acetal resin composition of the present invention is obtained by subjecting each component mentioned above to a blend or a melt knead after a blend.

As a melt kneader, well-known apparatuses such as a kneader, a roller mill and an extruder can be used. They are generally used for kneading melt resins. Of these, an extruder is most suitable in view of performance for sheilding oxygen, working environment, and the like. There are several types of extuders such as a single screw extruder, a twin screw extruder, an extruder with or without a vent and the like. Either extruder can be employed to prepare the acetal resin compositions of the present invention.

The composition of the present invention can be used by blending with a generally used acetal homopolymer, acetal copolymer, acetal ramification polymer or acetal block copolymer.

The composition of the present invention imparts an effective matte property to molded products having various surfaces. Particularly, it exibits a remarkable effect in the products molded with an embossing mold.

Suitable uses of the acetal resin compositions of the present invention are in a lever, an instrumental panel, parts for a switch, a handle, a crip, housing and the like. Particularly, the composition is suitable for interior automotive trim.

DESCRIPTION OF PREFERRED EMBODIMENTS

The present invention is now described in more detail by referring to Examples, but the scope thereof is not restricted by them.

In Examples and Comparative Examples, each characteristic of acetal resin compositions prepared according to the components shown in Tables 1 to 5 is evaluated by using red colored products.

Each characteristic of the composition in Examples and Comparative Examples was determined as follows:

1. Evaluation of matte performance (Gloss measurement)

A test piece (dumbbell according to JIS 1 size) was molded with an infection molder under the condition of a mold temperature of 80° C. and a cooling period of 20 seconds. Glossiness of the molded test piece was measured under an incidence angle of 60° and a reflection angle of 60° by using a glossimeter manufactured by Nippon Denshoku Kogyo Co., Ltd.

2. Evaluation of weathering resistance

The test piece used in the above glossiness measurement was placed in a UV fedeometer (WEL-SUM-HC-B.EM type manufactured by Suga Test Instruments Co., Ltd.), and then was exposed under the condition of a black panel temperature of 83° C. and a humidity of 50%. Aftera 1,200-hour exposure, color difference and a degree of a crack are measured under the following condition.

(i) Color difference

ΔE value (JIS Z-8730) of the light exposure surface of the test piece was measured by using a color difference meter (Handy Color Tester HC-T manufactured by Suga Test Instruments Co., Ltd.). A smaller value indicates a less color difference.

(ii) Degree of a crack

The light exposure surface of the test piece was observed with a microscope of 100 magnification. A degree of a crack was evaluated according to the following standard of the judgement.

The standard of judgement:
0: no cracks
1: a few cracks
2: long clear cracks
3: 20 or more long cracks in a magnified visual field
3. Flexural modulus A flexural modulus was measured according to ASTM D 790.

4. Occurrence of mold deposit

A molded product having a length of 75 mm, a width of 14 mm and a thickness of 2 mm was continuously molded by using an injection molder at a cylinder temperature of 200° C. and a mold temperature of 70° C. A number of molding shots before occurrence of a mold deposit were examined by using a pingate mold without a bleeder.

Symbols used in Tables are as follows:
UV absorber
C-1: 2-(2'-hydroxy-3',5'-t-butylphenyl)benzotriazole
C-2: 2-[2'-hydroxy-3',5'-bis-(α,α-dimethylbenzyl)phenyl] benzotriazole
C-3: 2-(2'-hydroxy-5'-metylphenyl)benzotriazole
C-4: 2-etoxy-2'-ethyloxalicacidbisanilide
C-5: 2-hydroxy-4-metoxybenzophenone
Hindered amine type light stabilizer
D-1: A hindered amine type light stabilizer represented by the general formula (I) wherein Y is a hydrogen atom, m is 2 and n is 1.5.
D-2: A hindered amine type light stabilizer represented by the general formula (I) wherein Y is a methyl group, m is 2 and n is 1.5.
D-3: A hindered amine type light stabilizer represented by the general formula (I) wherein Y is a methyl group, m is 1 and n is 1.5.
D-4: bis(2,2,6,6-tetramethyl-4-piperidyl)sebacate
D-5: bis(2,2,6,6-tetramethyl-4-piperidyl)adipate
D-6: 4-benzoyloxy-2,2,6,6-tetramethylpiperidine

REFERENCE EXAMPLE 1

(Production of an acetal resin)

An acetal resin copolymerized with 2.8% by weight of ethylene oxide was synthesized according to the method known in U.S. Pat. No. 3,027,352. An intrinsic viscosity of the acetal resin was 1.0. A melt index was 20.0 g/10 min. This acetal resin is referred to as P-1.

Powder of an acetal homopolymer, of which both ends were acetylated, was produced according to the method described in U.S. Pat. No. 2,998,409. An intrinsic viscosity was 1.2. A melt index was 9.0 g/10 min. This acetal resin is referred to as P-2.

The intrinsic viscosity was measured at 60° C. by dissolving 0.1% by weight of the polymer in a p-chlorophenol solution containing 2% by weight of α-pinene.

The melt index was measured according to ASTM D 1238-57T (E condition).

REFERENCE EXAMPLE 2

(Production of multiphase interpolymer)

Distilled water, 1 part by weight of dioctyl sodium sulfosuccinate as an emulsifier and 0.1 part by weight of Rongalite as a reducing agent per 100 parts by weight of the total amount of monomers were put in a 10-liter beaker equipped with a stirrer and a condenser, and uniformly dissolved.

To prepare an elastomeric phase for a central phase, a uniform solution comprising monomer compositions shown in the attached Tables and 0.1 part by weight of di-isopropylbenzene-hydroperoxide (hereinafter referred to as PBP) per 100 parts by weight of the total amount of monomers were added to the above-prepared uniform solution and polymerized at 80° C. The polymerization reaction lasted for about 40 min. A polymerization yield was substantially 100% at the time the reaction was completed.

Next, to prepare a rigid phase for an outermost phase, a uniform solution comprising monomer compositions shown in the attached Tables, 0.1 part by weight of PBP and 0.03 part by weight of n-octylmercaptan (hereinafter referred to as OM) per 100 parts by weight of the total amount of the monomers were added to the above-polymerized composition. A reaction at this stage lasted for about 15 min. Then, the temperature was elevated to 95° C. and maintained for 1 hour. The resultant polymer was put into a 0.5% aluminum chloride solution to agglomerate. Afterwards the agglomerated polymer was washed 15 times with hot water, and the multiphase interpolymer in the form of a white floc was obtained by drying the washed polymer. An average particle diameter of the interpolymer was 0.2 μm.

EXAMPLES 1 TO 9 AND COMPARATIVE EXAMPLES 1 TO 10

(Production of an acetal resin)

The acetal resin and the multiphase interpolymer were blended under nitrogen atmosphere in a mixing ratio shown in Tables 1 to 5. The mixture was melt kneaded by using a twin screw extruder with a bent having length/diameter=25 under the condition of a temperature of 200 ° C., a screw revolution number of 100 rpm and a discharge amount of 3 kg/hr to obtain pellets. And, the obtained pellets were dried. Next, 0.2 part by weight of a quinacridone red pigment, 0.2 part by weight of a UV absorber and 0.2 part by weight of a hindered amine type stabilizer shown in Tables 1 to 5 were added to 100 parts by weight of the pellets. The mixture was blended and melt kneaded with a single screw extruder again. After the obtained colored pellets were dried, the dried pellets were evaluated.

(Evaluation of composition)

A test piece was prepared from the obtained colored pellets according to the above mentioned condition. Each item was evaluated. The results are shown in Tables 1 to 5.

Abbreviations used in the Tables are as follows:
Component A
BA: butyl acrylate
methyl methacrylate
Component B
OMA: octyl acrylate 2EHA: 2-ethylhexyl acrylate
Other Monomers
GMA: glycidyl methacrylate
BD: butadiene
ST: styrene
ALMA: allyl methacrylate (Grafting agent)
EGA: ethylene glycol diacrylate (Cross-linker)
DVB: divinylbenzene (Cross-linker)

As is apparent from the above, the present invention can provide an acetal resin composition excellent in both matte property and flexural modulus, and causing little mold deposit during mold processing.

TABLE 1

|  |  | Example 1 | Example 2 | Example 3 | Example 4 |
|---|---|---|---|---|---|
| Multiphase interpolymer |  |  |  |  |  |
| Monomers for elastomeric phase (wt. %) | A* | BA (20) | MMA (36) | BA (20) | MMA (36) |
|  | B | 2EHA (76) | OMA (62) | 2EHA (76) | 2EHA (50) |
|  | C | EGA (2) ALMA (2) | EGA (1) ALMA (1) | EGA (2) ALMA (2) | EGA (2) ALMA (2) ST (10) |
| Monomers for rigid phase (wt. %) |  | MMA (100) | MMA (90) GMA (10) | MMA (100) | MMA (100) |
| Ratio of elastomeric phase to rigid phase |  | 5:5 | 5:5 | 5:5 | 7:3 |
| Mixed amount (wt. part) |  | 6 | 10 | 6 | 15 |
| Acetal resin |  | P - 1 | P - 1 | P - 2 | P - 1 |
| UV absorber |  | C - 2 | C - 1 | C - 2 | C - 3 |
| Hindered amine type light stabilizer |  | D - 4 | D - 2 | D - 4 | D - 1 |
| Glossiness (%) |  | 15 | 13 | 15 | 15 |
| Flexural modulus (kg/cm²) |  | 26,000 | 26,200 | 28,000 | 26,200 |
| Weathering resistance |  |  |  |  |  |
| Color difference (ΔE value) |  | 3 | 2 | 3 | 3 |
| Degree of crack |  | 0 | 0 | 0 | 1 |
| Shot number before mold deposit occurs |  | 3,700 | 3,800 | 3,800 | 3,700 |

*A: Component (A); B: Component (B); C: Other Monomers

TABLE 2

|  |  | Example 5 | Example 6 | Example 7 | Example 8 |
|---|---|---|---|---|---|
| Multiphase interpolymer |  |  |  |  |  |
| Monomers for elastomeric phase (wt. %) | A* | BA (16) | BA (20) | MMA (54) | MMA (10) |
|  | B | 2EHA (70) | 2EHA (78) | OMA (42) | 2EHA (86) |
|  | C | EGA (2) ALMA (2) BD (2) | EGA (2) | EGA (2) ALMA (2) | DVB (2) ALMA (2) |
| Monomers for rigid phase (wt. %) |  | MMA (88) ST (10) EGA (2) | MMA (100) | MMA (90) GMA (8) EGA (2) | MMA (98) DVB (2) |
| Ratio of elastomeric phase to rigid phase |  | 5:5 | 5:5 | 4:6 | 7:3 |
| Mixed amount (wt. part) |  | 3 | 6 | 30 | 5 |
| Acetal resin |  | P - 1 | P - 1 | P - 2 | P - 1 |
| UV absorber |  | C - 4 | C - 5 | C - 1 | C - 3 |
| Hindered amine type light stabilizer |  | D - 5 | D - 6 | D - 3 | D - 3 |
| Glossiness (%) |  | 16 | 14 | 12 | 15 |
| Flexural modulus (kg/cm²) |  | 26,400 | 26,500 | 26,000 | 26,200 |
| Weathering resistance |  |  |  |  |  |
| Color difference (ΔE value) |  | 1 | 2 | 2 | 2 |
| Degree of crack |  | 0 | 0 | 0 | 1 |
| Shot number before mold deposit occurs |  | 4,000 | 3,700 | 4,200 | 4,000 |

*A: Component (A); B: Component (B); C: Other Monomers

TABLE 3

|  |  | Example 9 | Comparative Example 1 | Comparative Example 2 | Comparative Example 3 |
|---|---|---|---|---|---|
| Multiphase interpolymer |  |  |  |  |  |
| Monomers for elastomeric phase (wt. %) | A* | BA (24) | BA (96) | — | — |
|  | B | 2EHA (70) | — | 2EHA (96) | OMA (94) |
|  | C | EGA (3) ALMA (3) | EGA (2) ALMA (2) | EGA (2) ALMA (2) | EGA (3) ALMA (3) |
| Monomers for rigid phase (wt. %) |  | MMA (100) | MMA (100) | MMA (100) | MMA (100) |
| Ratio of elastomeric phase to rigid phase |  | 5:5 | 5:5 | 5:5 | 5:5 |
| Mixed amount (wt. part) |  | 6 | 6 | 6 | 4 |
| Acetal resin |  | P - 1 | P - 1 | P - 1 | P - 1 |
| UV absorber |  | — | C - 2 | C - 2 | C - 1 |
| Hindered amine type light stabilizer |  | — | D - 4 | D - 4 | D - 3 |
| Glossiness (%) |  | 16 | 39 | 15 | 17 |
| Flexural modulus (kg/cm²) |  | 26,400 | 26,000 | 20,700 | 21,000 |
| Weathering resistance |  |  |  |  |  |
| Color difference (ΔE value) |  | 7 | 4 | 3 | 3 |
| Degree of crack |  | 3 | 2 | 2 | 2 |
| Shot number before mold deposit occurs |  | 3,800 | 3,100 | 3,000 | 3,300 |

*A: Component (A); B: Component (B); C: Other Monomers

TABLE 4

|  |  | Comparative Example 4 | Comparative Example 5 | Comparative Example 6 | Comparative Example 7 |
|---|---|---|---|---|---|
| Multiphase interpolymer |  |  |  |  |  |
| Monomers for elastomeric phase (wt. %) | A* | MMA (3) | — | BA (70) | BA (70) |
|  | B | OMA (93) | 2EHA (96) | 2EHA (26) | 2EHA (26) |
|  | C | EGA (2) ALMA (2) | EGA (2) ALMA (2) | EGA (2) ALMA (2) | EGA (2) ALMA (2) |
| Monomers for rigid phase (wt. %) |  | MMA (100) | MMA (100) | MMA (95) GMA (5) | MMA (100) |
| Ratio of elastomeric phase to rigid phase |  | 4:6 | 5:5 | 7:3 | 5:5 |
| Mixed amount (wt. part) |  | 4 | 6 | 6 | 6 |
| Acetal resin |  | P - 2 | P - 2 | P - 1 | P - 1 |
| UV absorber |  | C - 1 | C - 2 | C - 2 | C - 2 |
| Hindered amine type |  | D - 3 | D - 4 | D - 4 | D - 4 |

TABLE 4-continued

|  | Comparative Example 4 | Comparative Example 5 | Comparative Example 6 | Comparative Example 7 |
|---|---|---|---|---|
| light stabilizer |  |  |  |  |
| Glossiness (%) | 16 | 15 | 41 | 37 |
| Flexural modulus (kg/cm$^2$) | 20,500 | 21,000 | 26,000 | 26,200 |
| Weathering resistance |  |  |  |  |
| Color difference ($\Delta$E value) | 3 | 4 | 3 | 3 |
| Degree of crack | 2 | 0 | 2 | 2 |
| Shot number before mold deposit occurs | 3,300 | 3,300 | 3,300 | 3,000 |

*A: Component (A); B: Component (B); C: Other Monomers

TABLE 5

|  |  | Comparative Example 8 | Comparative Example 9 | Comparative Example 10 |
|---|---|---|---|---|
| Multiphase interpolymer |  |  |  |  |
| Monomers for elastomeric phase (wt. %) | A* | BA (20) | BA (70) | — |
|  | B | 2EHA (76) | 2EHA (26) | — |
|  | C | EGA (2) ALMA (2) | EGA (2) ALMA (2) | — |
| Monomers for rigid phase (wt. %) |  | MMA (100) | MMA (100) | — |
| Ratio of elastomeric phase to rigid phase |  | 5:5 | 5:5 | — |
| Mixed amount (wt. part) |  | 0.5 | 20 | — |
| Acetal resin |  | P - 1 | P - 1 | P - 1 |
| UV absorber |  | C - 2 | C - 2 | C - 2 |
| Hindered amine type light stabilizer |  | D - 4 | D - 4 | D - 4 |
| Glossiness (%) |  | 39 | 35 | 82 |
| Flexural modulus (kg/cm$^2$) |  | 26,000 | 25,800 | 26,200 |
| Weathering resistance |  |  |  |  |
| Color difference ($\Delta$E value) |  | 4 | 3 | 2 |
| Degree of crack |  | 2 | 2 | 0 |
| Shot number before mold deposit occurs |  | 800 | 1,000 | 450 |

*A: Component (A); B: Component (B); C: Other Monomers

What is claimed is:

1. An acetal resin composition comprising:
   (1) 100 parts by weight of an acetal resin; and
   (2) from 1 to 100 parts by weight of a multiphase interpolymer particle comprising at least an elastomeric phase and a rigid phase, the elastomeric phase obtained by copolymerizing:
      (A) from 10 to [54% by weight, based on the total weight of monomers for the elastomeric phase, of at least one compound selected from the group consisting of $C_1$ to $C_6$-alkyl monoacrylate, $C_1$ to $C_6$-alkyl monomethacrylate, $C_1$ to $C_6$-hydroxyalkyl monoacrylate and $C_1$ to $C_6$-hydroxyalkyl monomethacrylate;
      (B) from 42 to 86% by weight, based on the total weight of monomers for the elastomeric phase, of at least one compound selected from the group consisting of $C_7$ to $C_{12}$-alkyl monoacrylate and $C_7$ to $C_{12}$-alkyl monomethacrylate; and
      (C) from 2 to 14% by weight, based on the total weight of monomers for the elastomeric phase, of at least one compound selected from the group consisting of an aromatic vinyl monomero a vinyl halide monomer, a nitrile monomer, a vinyl ester, an unsaturated amide, a vinyl alkyl ether, and a monomer having two or more of double bonds in one molecule.

2. The acetal resin composition according to claim 1, wherein the multiphase interpolymer particle has a two-phase structure comprising an elastomeric phase as a central core phase and a rigid phase as an outermost phase.

3. The acetal resin composition according to claim 1, wherein the multiphase interpolymer particle has a three-phase structure comprising an elastomeric phase as an intermediate phase and rigid phases as central core and outermost phases.

4. The acetal resin composition according to claim 1, wherein a diameter of the multiphase interpolymer particle is 1 μm or less.

5. The acetal resin composition according to claim 1, further containing from 0.01 to 5 parts by weight of at least one compound selected from the group consisting of a UV absorber having a benzotriazole and a UV absorber having an oxalic anilide, and from 0.01 to 5 parts by weight of a hindered amine type light stabilizer.

6. The acetal resin composition according to claim 1, wherein the elastomeric phase is obtained by copolymerizing Components (A) and (B) with a conjugated diene.

7. The acetal resin compositioin according to claim 1, wherein an outermost phase of the multicore interpolymer particle is obtained by copolymerising monomers composed of the outermost phase with a vinyl monomer having at least one functional group comprising an epoxy group, a hydroxy group or a carbonyl group.

8. The acetal resin composition according to claim 1, wherein the multiphase interpolymer has an alkali metal content of 100 ppm or less and a sulfur content of 200 ppm or less.

9. The acetal resin composition according to claim 1, wherein a cross-linker is not copolymerized in the rigid phase of the multiphase interpolymer particle.

10. The acetal resin composition according to claim 1, wherein the elastomeric phase is composed of polymers having a glass transition temperature of less than 25° C. and the rigid phase is composed of polymers having a glass transition temperature of 25° C. or more.

11. The acetal resin composition according to claim 1, wherein (A) is selected from the group consisting of butyl acrylate and methyl methylmethacrylate, (B) is selected from the group consisting of octyl acrylate and 2-ethylhexyl acrylate, and (C) is selected from the group consisting of glycidyl methacrylate, butadiene, styrene, allyl methacrylate, ethylene glycol diacrylate, and divinyl benzene.

* * * * *